United States Patent
Wang et al.

(10) Patent No.: US 11,050,077 B2
(45) Date of Patent: Jun. 29, 2021

(54) BATTERY SYSTEM

(71) Applicant: National University of Singapore, Singapore (SG)

(72) Inventors: Qing Wang, Singapore (SG); Yunguang Zhu, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 332 days.

(21) Appl. No.: 15/503,563

(22) PCT Filed: Aug. 17, 2015

(86) PCT No.: PCT/SG2015/050260
§ 371 (c)(1),
(2) Date: Feb. 13, 2017

(87) PCT Pub. No.: WO2016/024919
PCT Pub. Date: Feb. 18, 2016

(65) Prior Publication Data
US 2017/0237106 A1    Aug. 17, 2017

Related U.S. Application Data

(60) Provisional application No. 62/037,698, filed on Aug. 15, 2014.

(51) Int. Cl.
*H01M 8/18* (2006.01)
*H01M 4/38* (2006.01)
(Continued)

(52) U.S. Cl.
CPC .......... *H01M 8/188* (2013.01); *H01M 4/134* (2013.01); *H01M 4/382* (2013.01); *H01M 4/62* (2013.01);
(Continued)

(58) Field of Classification Search
CPC .............................. H01M 8/188; H01M 4/134
See application file for complete search history.

(56) References Cited

U.S. PATENT DOCUMENTS 5,190,833 A * 3/1993 Goldstein ............... H01M 4/86
429/406
9,225,015 B2 * 12/2015 Lee ....................... H01M 4/382
(Continued)

FOREIGN PATENT DOCUMENTS

WO        2014-014548 A2    1/2014

OTHER PUBLICATIONS

Jin et al., "Application of lithiated Nafion ionomer film as functional separator for lithium sulfur cells", Journal of Power Sources 218 (2012) 163-167.*
(Continued)

*Primary Examiner* — Tae-Sik Kang
(74) *Attorney, Agent, or Firm* — Kilpatrick Townsend & Stockton LLP

(57) ABSTRACT

The present invention relates to batteries and more particularly to battery systems. More particularly, the present invention relates to metal-air based battery systems. In an aspect of the present invention, there is provided a battery system, the system comprising (a) a cell comprising a metal anode and a cathode current collector, the metal anode and
(Continued)

Figure 1:
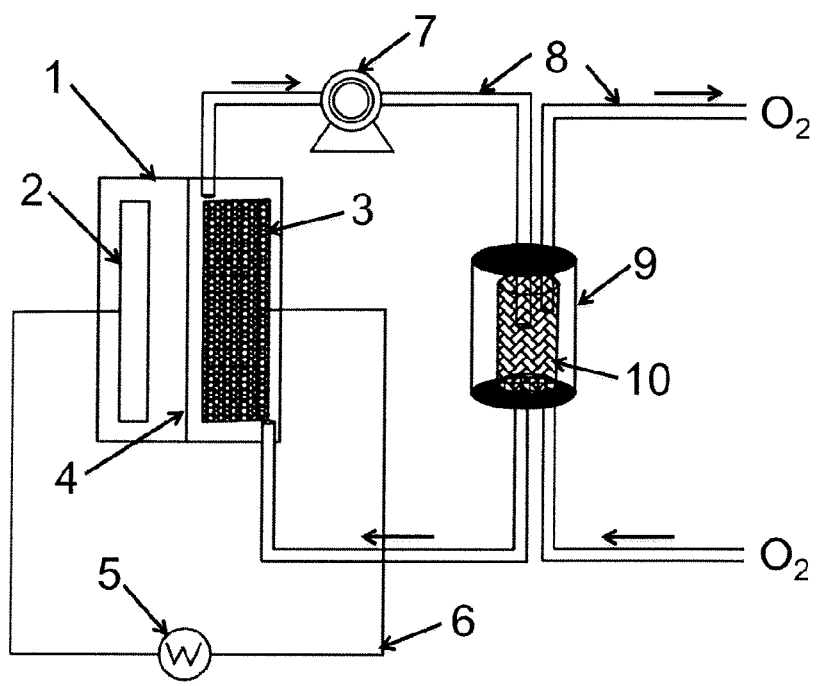
Figure 1:
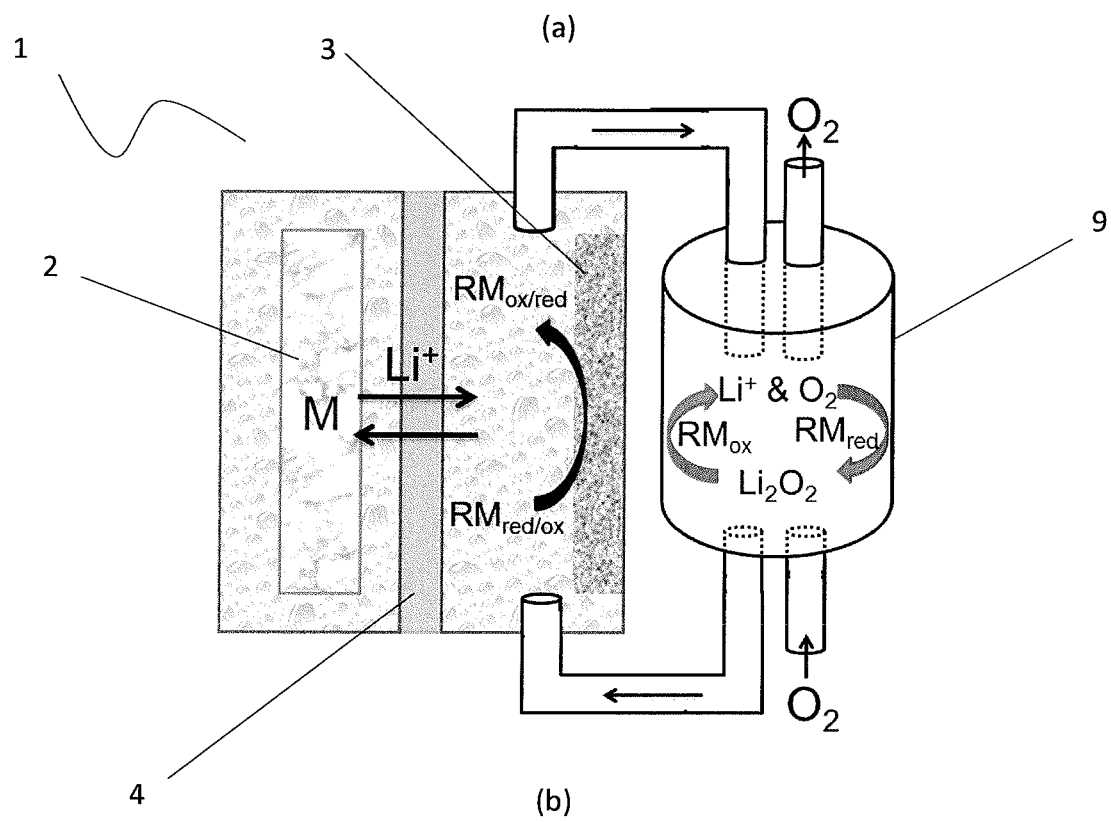

the cathode current collector separated by a separator; (d) a gas diffusion tank; and (e) an electrolyte between the cathode current collector and the gas diffusion tank, the electrolyte comprising redox molecules.

12 Claims, 9 Drawing Sheets

(51) Int. Cl.
- *H01M 12/08* (2006.01)
- *H01M 8/04276* (2016.01)
- *H01M 8/04119* (2016.01)
- *H01M 4/134* (2010.01)
- *H01M 4/62* (2006.01)
- *H01M 8/04186* (2016.01)
- *H01M 4/86* (2006.01)
- *H01M 10/42* (2006.01)
- *H01M 50/411* (2021.01)

(52) U.S. Cl.
CPC ... *H01M 8/04119* (2013.01); *H01M 8/04186* (2013.01); *H01M 8/04276* (2013.01); *H01M 12/08* (2013.01); *H01M 4/8615* (2013.01); *H01M 10/4235* (2013.01); *H01M 50/411* (2021.01); *Y02E 60/10* (2013.01)

(56) References Cited

U.S. PATENT DOCUMENTS

| | | | | |
|---|---|---|---|---|
| 2011/0294021 | A1* | 12/2011 | Suto | H01M 12/02 429/403 |
| 2012/0028137 | A1 | 2/2012 | Chase et al. | |
| 2013/0309581 | A1* | 11/2013 | Yamaguchi | H01M 12/06 429/403 |
| 2015/0048777 | A1* | 2/2015 | Goldstein | H02J 7/355 320/101 |

OTHER PUBLICATIONS

Chen, Yuhui et al., "Charging a Li-$O_2$ battery using a redox mediator," Nature Chemistry, May 12, 2013 (Online), vol. 5, No. 6, pp. 489-494.

Zhu, Y. et al., "Redox flow lithium oxygen batteries." Abstract in 227th ECS Meeting, May 27, 2015, Chicago, IL, USA <Retrieved on Oct. 21, 2015 from http://ma.ecsdl.org/content/MA2015-01/2/418.short>.

Zhu, Yun Guang et al., "Dual redox catalysts for oxygen reduction and evolution reactions: towards a redox flow Li-$O_2$ battery," Chemical Communications, Apr. 27, 2015 (Online), vol. 51, bo. 46, pp. 9451-9454.

International Search Report and Written Opinion dated Oct. 26, 2015 issued in International Application No. PCT/SG2015/050260.

\* cited by examiner

BATTERY SYSTEM

CROSS REFERENCE TO RELATED APPLICATIONS

This application is a U.S. National Stage of International Application No. PCT/SG2015/050260, filed 17 Aug. 2015, which claims the benefit of U.S. Provisional Application No. 62/037,698, filed 15 Aug. 2014, the entire contents of which are herein incorporated by reference.

The present invention relates to batteries and more particularly to battery systems. More particularly, the present invention relates to metal-air based battery systems. Still more particularly, the present invention is concerned with metal-air battery systems with high energy density, high coulombic efficiency, low voltage hysteresis and good cycling stability, which are based on a redox flow system. The reversible formation and decomposition of the products are achieved based on the reversible redox targeting reactions of oxygen, which greatly reduces the overpotential, eliminates the use of noble electrocatalysts, and alleviate the clogging of metal-oxygen products in the gas diffusion electrode.

With the increasing demand for high-density energy storage, various electrochemical energy storage technologies have been proposed, of which lithium-oxygen (Li—$O_2$) battery is believed to be one of the most promising solutions. Li—$O_2$ battery "breathes" oxygen from the air as a reactant, which greatly enhances the gravimetric energy density and reduces the cost of the cell. Therefore, Li—$O_2$ batteries have recently attracted considerable attention from all over the world. Despite the great promises, Li—$O_2$ battery confronts several critical issues before it becomes a credible solution for next generation energy storage, for instance, stability of aprotic electrolyte and electrode in the presence of $O_2^-$ radical, effectiveness of catalyst with the passivation of $Li_2O_2$, microstructures of cathode to accommodate $Li_2O_2$ while allow the access of $O_2$ and $Li^+$, and cyclability of lithium anode upon prolonged cycling, etc. While profound studies have been done in searching stable electrolytes and efficient oxygen electrocatalysts, challenges relating to surface passivation and pore clogging by the insoluble $Li_2O_2$ in the gas diffusion cathode remain. This severely impairs the round-trip energy efficiency and limits the achievable capacity of the cell. Recently, redox catalysis was introduced to mitigate the overpotentials for oxygen reduction or evolution reactions by utilizing redox mediators dissolved in the electrolyte. These soluble redox active species could either reduce $O_2$ forming $Li_2O_2$ in the presence of $Li^+$ in the electrolyte, or oxidize $Li_2O_2$ releasing oxygen. Since the "catalysts" exist in the electrolyte, the adverse effect of surface passivation is alleviated. By contrast, these redox-catalyzed reactions towards $O_2$ in essence resemble the "redox targeting" reactions recently proposed for lithium-ion battery materials. In the presence of suitable redox mediators in the electrolyte, battery materials could be charged and discharged through reversible chemical lithiation and delithiation without attaching to the current collector, which intuitively results in a novel battery system—redox flow lithium-ion batteries (RFLB). A Li-air fuel cell system with circulating catholyte has been demonstrated. A flow system using soluble catalyst in an aqueous catholyte for the oxygen reduction reaction, which in principle results of a redox flow Li—$O_2$ primary cell, has also been proposed.

However, metal-oxygen (particularly, Li—$O_2$) cell suffers two crucial issues: (a) poor cyclability and (b) low energy efficiency.

While Li-ion battery has been widely used and is the state-of-the-art power source, the relative low energy density (~160 Wh/kg in practice) makes Li-ion battery uncompetitive for other applications such as electric vehicle as compared to gasoline. Thus, Li-air batteries, with almost 10 times theoretical energy density of Li-ion battery, have attracted great attention worldwide. While promising, Li-air batteries suffer from low lithium utilzation yield, low energy efficiency, poor cycling life, and low power capability, which limit their practical application. ENREF 2 ENREF 2 In order to overcome these issues, researchers have tried to design mesoporous cathode current collectors or to develop superior catalysts. However, all these development is far from practical use due to the unsatisfactory performance.

As such, there is a need for an improved battery cell or battery system.

The listing or discussion of an apparently prior-published document in this specification should not necessarily be taken as an acknowledgement that the document is part of the state of the art or is common general knowledge.

Any document referred to herein is hereby incorporated by reference in its entirety.

In an aspect of the present invention, there is provided a battery system, the system comprising (a) a cell comprising a metal anode and a cathode current collector, the metal anode and the cathode current collector separated by a separator; (d) a gas diffusion tank; and (e) an electrolyte between the cathode current collector and the gas diffusion tank, the electrolyte comprising redox molecules.

Advantageously, the gas diffusion tank is spatially separate from the cell, which obviates the passivation and pore clogging of the cathode. Yet, the present system enables the reversible formation and decomposition of discharging products via redox targeting reactions in the gas diffusion tank.

Preferably, for the oxygen reduction reaction, suitable redox molecules include quinone derivatives such as 2,5-Di-tert-butyl-1,4-benzoquinone (DTBBQ). For the oxygen evolution reaction, suitable redox molecules include aromatic amine derivatives such as tris-{4-[2-(2-methoxyethoxy)ethoxy]-phenyl}-amine (TMPPA), phenazine derivatives, such as 5,10-Dihydro-5,10-dimethyl phenazine (DH-DMPA), Phenothiazine derivatives, such as 10H-phenothiazine, quinoxaline, such as 2,3,6-trimethylquinoxialine, $I_2$, phenothiazine/phenoaxozine, 2,2,5,5-tetramethyl-4-piperidin-1-oxyl (TEMPO), metal phthalocyanine, tetrathiafulvene (TTF), Tetracyanoquinodimethane (TCNQ), N,N,N,N,-tetramethylphenylenediamine (TMPD).

Preferably, the concentration of the redox molecules in the electrolyte is about 5 mM to 5M.

Preferably, the separator is selectively allow the passage of metal ions only. The separator may be any one selected from the group comprising: a lithiated Nafion or its composite membrane, and a lithium ion conductive ceramic membrane.

Preferably, the metal in the metal anode is any metal selected from the group comprising: lithium, potassium, calcium, aluminium, zinc and magnesium. More preferably, the metal anode is lithium-based and may be a vinylene carbonate pre-treated lithium foil.

Preferably, the current collector comprises a porous substrate. In an embodiment, the porous substrate may be carbon felt.

Preferably, the system further comprises a pump to pump electrolyte fluid between the cell and the tank. In an embodiment, the pump may be a peristaltic pump.

The gas in the gas diffusion tank may be any air, including dry air. Preferably, the gas in the gas diffusion tank is oxygen and the pressure of oxygen in the gas diffusion tank is 1 atmosphere.

Advantageously, in order to overcome the problems faced by existing art, the present redox flow metal-oxygen battery system has been developed and demonstrated here. In the present invention, the power generation and oxygen reactions are separated, which are bridged by redox molecules dissolved in the electrolyte. As a result, the overpotential caused by surface passivation and pore clogging of the cathode are greatly alleviated. This system design successfully addresses the critical problems confronted by the conventional metal-air systems and opens up a new avenue to the commercialization of high energy metal-air battery systems.

In order that the present invention may be fully understood and readily put into practical effect, there shall now be described by way of non-limitative examples only preferred embodiments of the present invention, the description being with reference to the accompanying illustrative figures.

In the Figures:

FIGS. 1(a) and (b) show a battery system according to an embodiment of the present invention.

Figure 2:
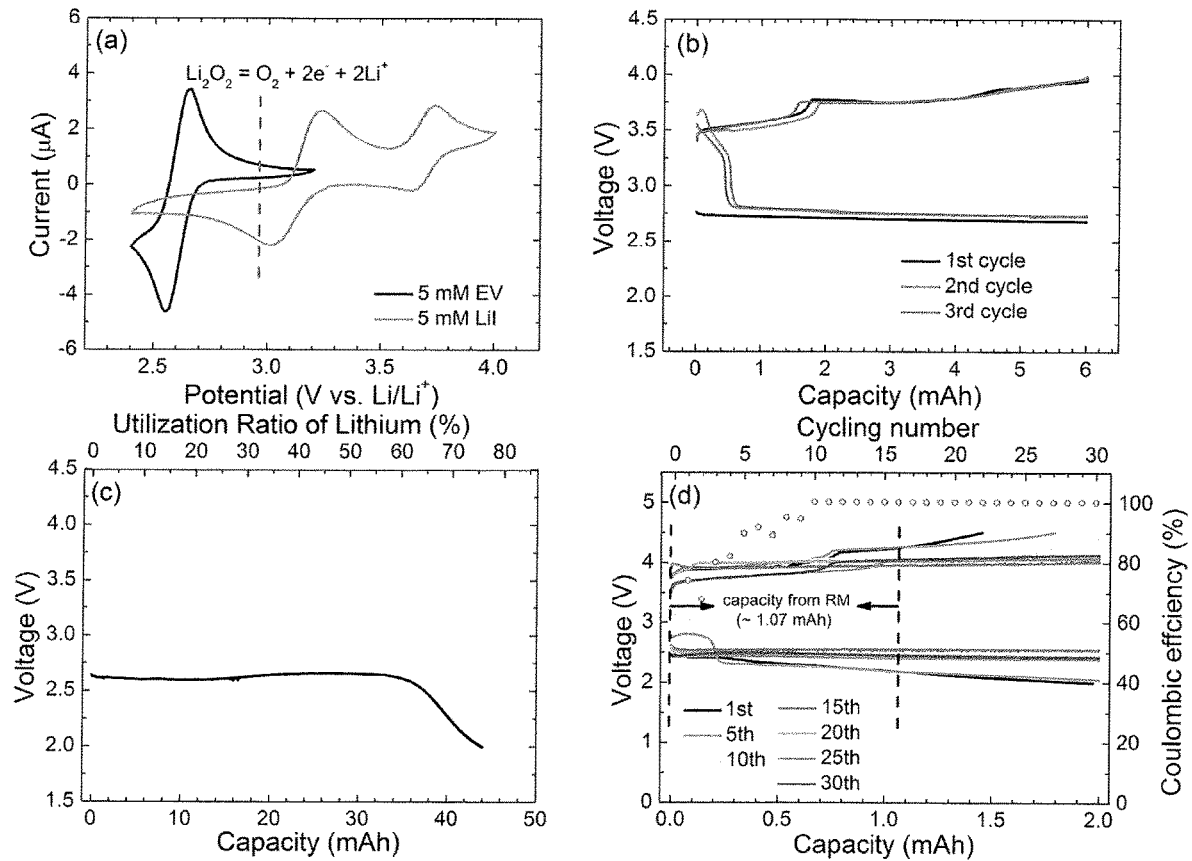

FIG. 2(a) Cyclic voltammograms of EV and LiI in TEGDME. The scan rate is 0.10 V/s. The redox potential of $Li_2O_2$ is indicated for reference. (b) Discharge/charge curves of a RFLOB in the first 3 cycles. The current density is 0.05 mA/cm$^2$. (c) The discharge curve of a RFLOB primary cell showing the high utilization ratio of lithium anode in the presence of 10 mM $EV^{2+}$. The current density is 0.125 mA/cm$^2$. (d) Discharge/charge curves and Coulombic efficiency of a RFLOB employing a PVDF-Nafion membrane at different cycle numbers. The current density is 0.125 mA/cm$^2$. The electrolyte was 1.0 M LiTFSI in TEGDME containing 10 mM $EV^{2+}$/10 mM $I^-$, with a volume of 8 ml in (b), (c), and 4 ml in (d).

Figure 3:
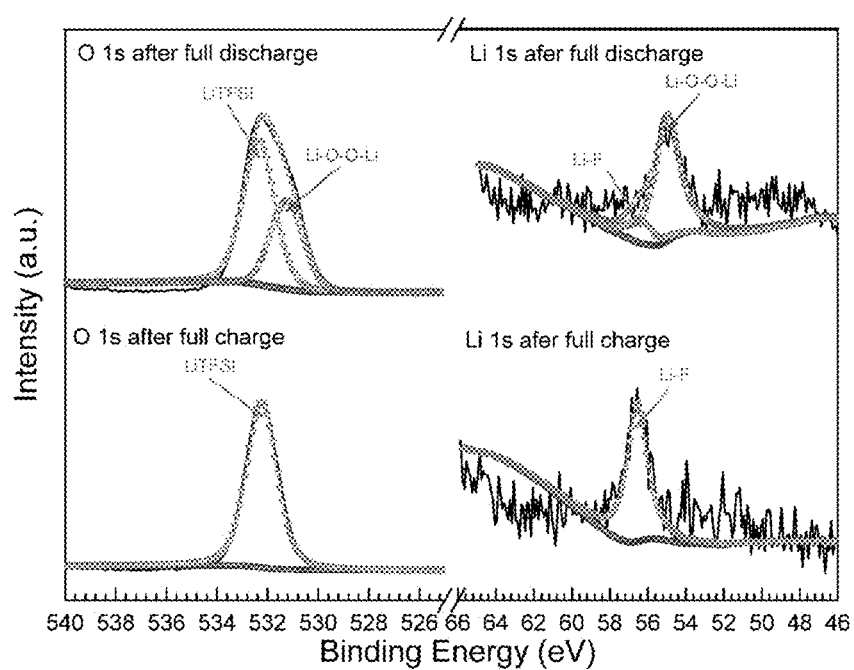

FIG. 3 X-ray photoemission spectroscopy (XPS) measurement of Li 1s and O 1s spectra and the corresponding peak deconvolutions. The upper and lower panels display those of the discharged and charged species in the GDT tank, respectively.

Figure 4:
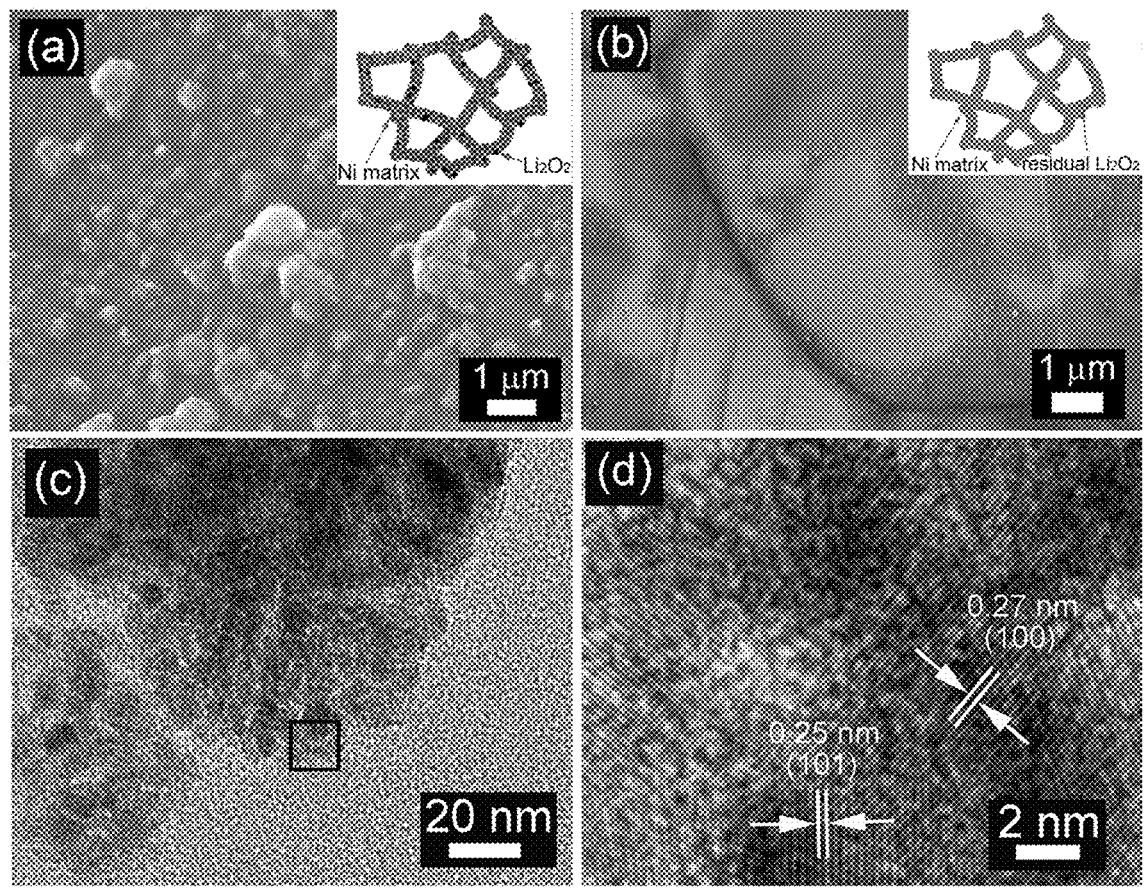

FIG. 4(a-b) Field emission scanning electron microscopy (FESEM) images showing the morphology evolution of Ni foam after discharging (a) and re-charging (b) in the GDT tank. The insets illustrate the formation and decomposition of $Li_2O_2$ on the surface of Ni foam. (c-d) Transmission electron microscopy (TEM) and high-resolution TEM images showing the agglomerated nanoparticles (c) of $Li_2O_2$ and the lattice fringes (d).

Figure 5:
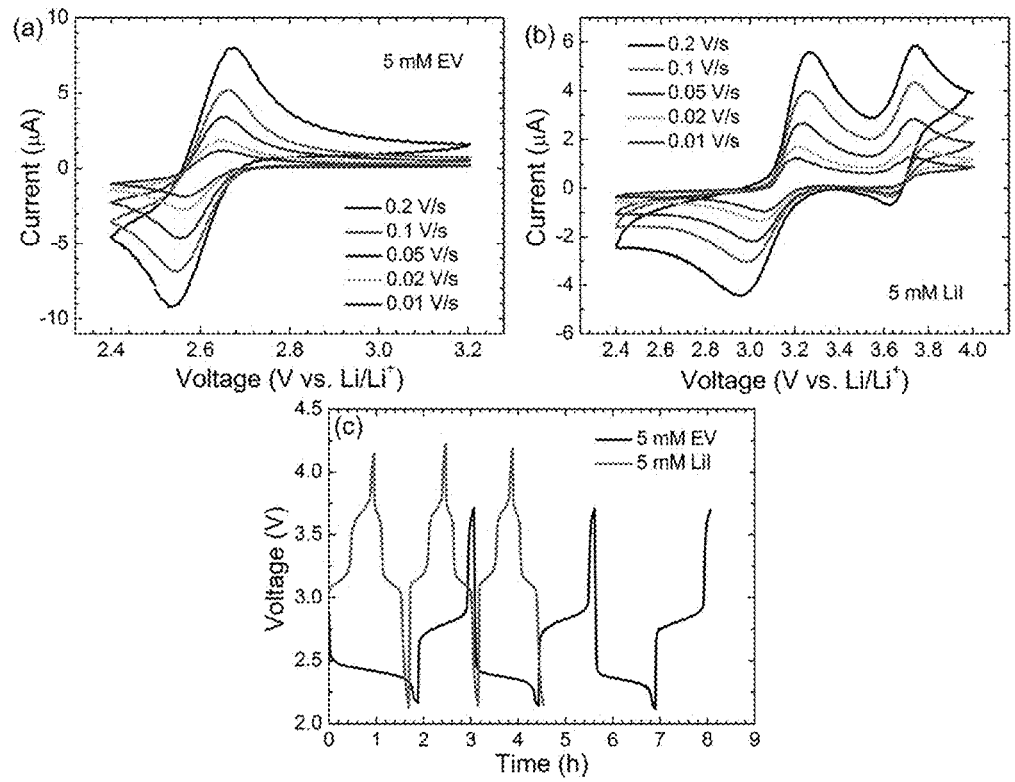

FIG. 5 CV curves of 5 mM EV (a) and 5 mM LiI (b) in 1 M LiTFSI-TEGDME electrolyte at various scan rates (0.2, 0.1, 0.05, 0.02, 0.01 V/s). (c) Charge/discharge curves of 5 mM EV and 5 mM LiI in static cells with PVDF-Nafion membrane. The current density is 0.05 mA/cm$^2$.

Figure 6:
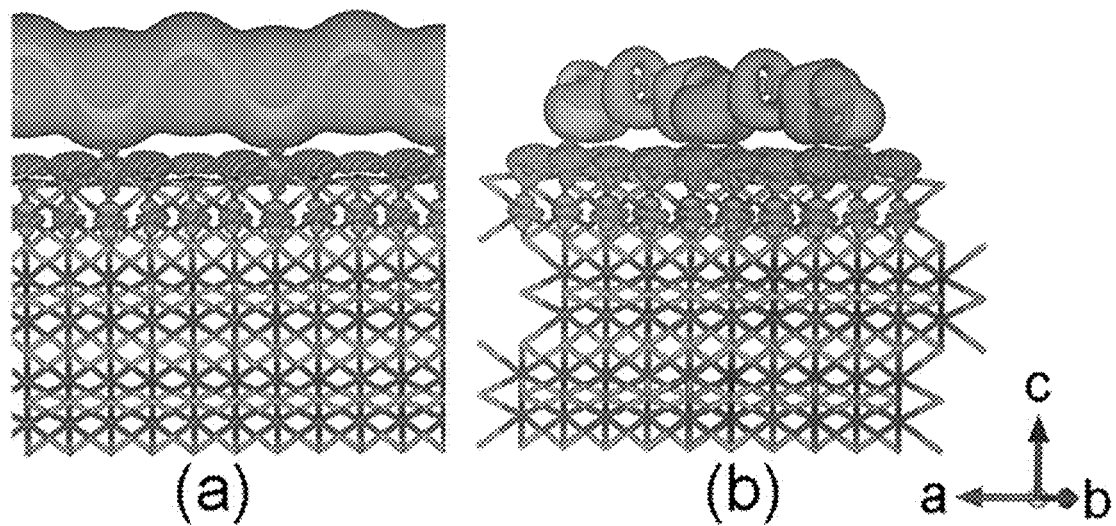

FIG. 6 Electron density difference maps associated with the interactions in $Li_2O_2/I_2$ (a) and $Li_2O_2/I_3^-$ system (b). Isovalues: |0.0012 a.u.|. $I_2$ and $I_3^-$ are adsorbed on the (0001) surface of $Li_2O_2$ in parallel adsorption geometry. The blue and yellow zones correspond to electron density deduction and enhancement regions, respectively.

Figure 7:
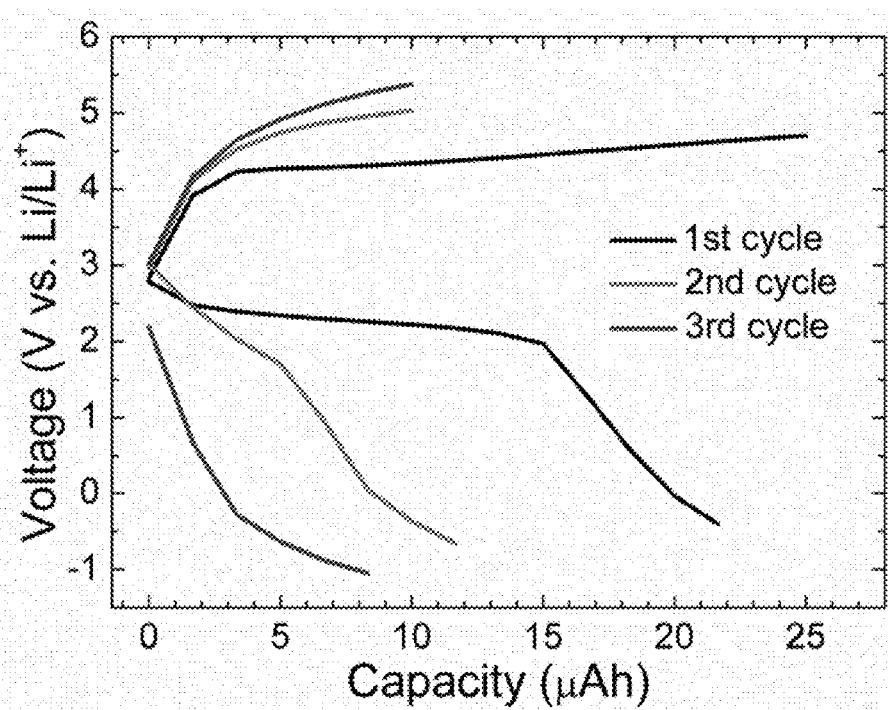

FIG. 7 Charge and discharge curves of RFLOB in the absence of redox mediators in the electrolyte. The current density was 0.05 mA/cm$^2$.

Figure 8:
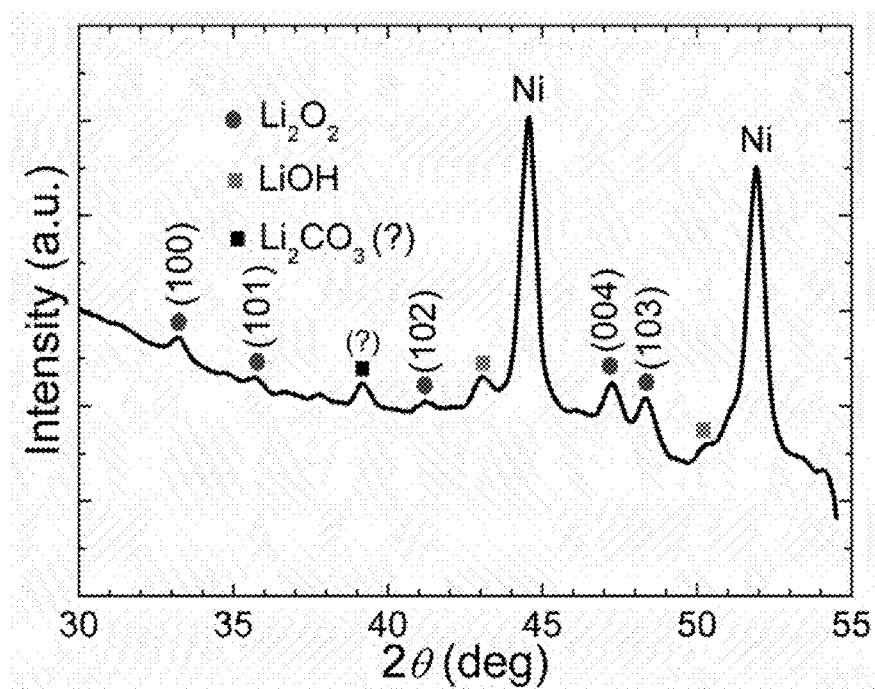

FIG. 8 XRD pattern of the discharging products deposited on Ni foam in the GDT tank. Diffraction peaks from $Li_2O_2$ are clearly identified (JCPDS File No. 01-074-0115) besides those from Ni foam.

Figure 9:
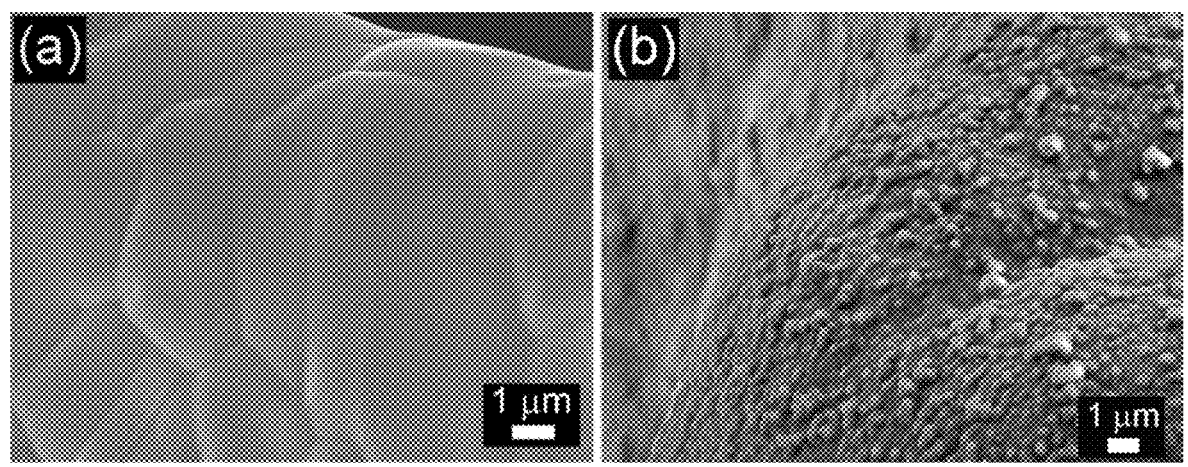

FIG. 9 SEM photos show the morphology of pristine nickel foam before (a) and after (b) fully discharging the cell as indicated in FIG. 2c.

In the present invention, we demonstrate a novel design of redox flow Li-oxygen batteries. Resorting to the reversible redox targeting reactions, the formation and decomposition of $Li_2O_2$ could be reversibly achieved without using noble catalysts in a tank separated from the electrode, which could greatly alleviate the pore clogging effect of the insoluble $Li_2O_2$ and significantly lower the cost. With this novel working principle, lithium metal could be readily replaced by other metals such as aluminium, zinc, magnesium, etc., if proper electrolytes and redox molecules are employed, so that redox flow metal-air batteries could be built. Lithium is used here in a non-limiting example.

With reference to FIG. 1, there is provided a power generation redox flow metal-air battery system having a cell or cell stack 1 having a metal anode 2, a cathode current collector 3 and a separator membrane 4. The cathode current collector may be a porous current collector and the cathodic compartment may be filled with an electrolyte containing redox molecules. The separator membrane can prevent the crossover of redox molecules and allow lithium ions to pass through. The cell stack 1 constitutes a lithium metal anode and carbon felt cathode (2 cm×2 cm), separated by a membrane. A gas diffusion tank (GDT) is connected to the cathodic compartment through a pump. During discharge process, oxygen flows into the tank and is reduced to form $Li_2O_2$ while electrolyte fluid containing redox mediators and $Li^+$ circulates between GDT and cell. During the discharging process, lithium metal in the anodic compartment is oxidized to $Li^+$. Meanwhile, oxidized redox molecule 1 ($RM^1_{ox}$) in the cathodic compartment will be reduced on the porous current collector 3 to $RM^1_{red}$. The latter will then flow into the gas diffusion tank 9 with the help of pump 7. In embodiment, the gas diffusion tank 9 is an oxygen ($O_2$) diffusion tank. In the tank 9, $RM^1_{red}$ will further reduce $O_2$ to $O_2^-$ which will react with $Li^+$ to form $Li_2O_2$. In the above process, $RM^1_{red}$ will be oxidized to $RM^1_{ox}$, which will then flow back to the cell component and start a new cycle. The above process will continue until lithium metal is used up.

During the charging process, $Li^+$ is plated in the anodic compartment. Meanwhile, reduced redox molecule 2 ($RM^2_{red}$) will be oxidized on the porous current collector 3 to $RM^2_{ox}$. The latter will then flow into the $O_2$ diffusion tank 9 with the help of pump 7. In the $O_2$ diffusion tank 9, $RM^2_{ox}$ will further oxidize $Li_2O_2$ to form $Li^+$ and $O_2$. During this process, $RM^2_{ox}$ is reduced back to $RM^2_{red}$, which will then flow back to the cell component and start a new cycle. The charge process will go on until all $Li_2O_2$ are used up.

The porous matrix 10 in the $O_2$ diffusion tank 9 is used to improve the chemical reaction sites in the tank. The power supply or load 5 is used to provide electricity during charging process and consume electricity during discharging process.

The present invention will be described in detail and the corresponding electrochemical and chemical reactions are shown below in the example below.

EXAMPLE

Materials and Methods

1. Materials

Tetraethyleneglycol dimethylether (TEGDME, 99%, Sigma-Aldrich) and lithium bis(trifluoromethane)sulfonimide (LiTFSI, Sigma-Aldrich) were used as solvent and lithium salt for electrolyte preparation. Ethyl viologen diperchlorate (EV, 98%, Sigma-Aldrich) and LiI (99%, Sigma-Aldrich) were employed as redox mediators for oxygen reduction and evolution reactions, respectively. Vinylene carbonate (VC, 97%, Sigma-Aldrich) was used to passivate Li metal and promote the formation of solid electrolyte interface (SEI) film on lithium surface. Prior to use, all the above chemicals were stored in an argon-filled glove box without exposure to air.

2. RFLOB Cell Assembly

Lithium foil was pretreated by immersing in 1 M LiTFSI-TEGDME electrolyte containing 5 vol. % VC for 24 h and used as anode. Carbon felt was used as cathode current collector. The electrochemical cell was fabricated by sandwiching the lithium foil and carbon felt in a cell stack made of stainless steel, in which the two electrodes are separated by a Celgard 2300 separator. The size of the electrode is 2 cm×2 cm. The gas diffusion tank (GDT) is made of a glass vial loaded with nickel foam to construct gas diffusion layers and provide deposition site for $Li_2O_2$. Alternatively, the porous matrix in the tank can be any high surface materials having good chemcial stability toward O2 and redox electrolytes, such as glass fibre, plastics, etc. 8 ml electrolyte consisting of 10 mM LiI and 10 mM EV in 1 M LiTFSI-TEGDME was prepared and transferred into the GDT tank. The GDT tank has an inlet and an outlet for the electrolyte fluid and oxygen, respectively, and is connected with the electrochemical cell. Electrolyte fluid is circulated between the cell and tank by a peristaltic pump. The cell used for cycling test was fabricated with PVDF-Nafion membrane in place of Celgard separator. To speed up the testing, 4 ml electrolyte consisting of 10 mM LiI and 10 mM EV in 1 M LiTFSI-TEGDME was used. The preparation and evaluation of the PVDF-Nafion membrane will be reported elsewhere since it is beyond the scope of this study.

3. Electrochemical Measurements

Cyclic voltammograms of the two redox molecules were measured with a three-electrode system at different scan rates (0.01, 0.02, 0.05, 0.1, 0.2 V/s). Lithium metal was used as counter and reference electrodes, and a Pt disk was used as the working electrode. The battery was tested at galvanostatic mode at different current densities. All the above electrochemical measurements were performed on an Autolab electrochemical workstation (Metrohm Autolab, PGSTAT302N).

4. Characterizations

Field emission scanning electron microscopy (FESEM) images were obtained on a Zeiss Supra 40 field-effect scanning electron microscope. Prior to the FESEM measurement, the Ni foam was taken out of the GDT tank and washed by acetonitrile for three times before drying in a vacuum oven at 80° C. for 24 h. High-resolution transmission electron microscopy (HRTEM) images were recorded with JEOL 3010F. The Ni foam sample was washed in acetonitrile for three times and sonicated for 20 min. The suspension was collected and dropped onto copper mesh for TEM measurement. The X-ray photoelectron spectroscopy (XPS) analysis was conducted on a Kratos Analytical Axis Ultra DLD Spectrometer. All the samples were protected by argon during the preparation and transfer processes. Powder X-ray diffraction (XRD) pattern was measured by a powder diffractometer (Bruker D8 Advanced Diffractometer System) with Cu Kα (1.5418 Å) source. The samples were sealed by Kapton film in the glove box with argon and then transferred outside to take XRD measurement.

5. Computation Method

A two-dimensional slab model was adopted to simulate the stable $Li_2O_2$ (0 0 0 1) surface. First-principles calculations were performed by using the plane-wave technique implemented in Vienna ab initio simulation package (VASP). The generalized gradient approximation with the Perdew-Burke-Ernzerhof functional has been employed to describe the exchange-correction potential in all calculations. Projector-augmented wave potentials were employed to describe the electron-ion interaction and a cutoff energy is set to 400 eV.

In general, one should note that these two molecules would not chemically react with each other upon operation. During discharging, both of the molecules will subsequently be reduced to $I^{3-}$ and $EV^+$ in the cell. Similarly during charging, both of molecules will subsequently be oxidized to $EV^{2+}$ and $I_2$. So it is unlikely that both $I_2$ and $EV^+$ co-exist in the catholyte causing reaction between the two.

As a preliminary proof-of-concept study, we do not attempt to study the influences of the flow rate and other operation parameters on the overall device performance before the following factors are optimized: firstly, the PVDF—Nafion membrane is resistive, which makes up a big IR drop. Secondly, the sluggish reaction between $I_2$ and $Li_2O_2$ and those of $I^-$ on the electrode account for a major loss of overpotential during charging. As a result, the discharging/charging current density is relatively low.

6. Discussion

In the present application, we demonstrate a new implementable solution—rechargeable redox flow Li—$O_2$ battery (RFLOB) to tackle the critical issues confronted by non-aqueous Li—$O_2$ batteries. As illustrated in FIG. 1, the RFLOB has a gas diffusion tank (GDT) connected to the electrochemical cell stack. Electrolyte fluid is circulated between the tank and cell by a peristaltic pump, in which for the first time we concurrently introduced two different redox mediators to catalyze the $O_2$ reduction and evolution reactions during discharging and charging processes, respectively. As a result, the use of conventional electrocatalysts on the cathode has been completely avoided. The GDT tank is filled with porous material allowing the easy access of redox fluid and $O_2$, in which the $O_2$ pressure is kept constant through a gas inlet and outlet. During discharging process, redox mediator $RM_1$ is reduced at cathode and flows into the GDT tank where it is oxidized by $O_2$ in the presence of $Li^+$:

$$RM_1^{ox} + e^- \rightarrow RM_1^{red} \text{ (electrochemical reaction on cathode)} \quad (1)$$

$$Li^+ + RM_1^{red} + O_2 \rightarrow Li_2O_2 + RM_1^{ox} \text{ (chemical reaction GDT)} \quad (2)$$

In this process, $Li_2O_2$ is formed and deposited in the porous matrix of the GDT tank. The regenerated $RM_1$ then flows back to the cell for a second round of reactions. During charging process, another redox mediator $RM_2$ is oxidized at cathode and flows into the GDT tank where it is reduced by $Li_2O_2$ releasing $O_2$.

$$Rm_2^{red} \rightarrow RM_2^{ox} + e^- \text{ (electrochemical reaction on cathode)} \quad (3)$$

$$Li_2O_2 + RM_2^{ox} \rightarrow Li^+ + RM_2^{red} + O_2 \text{ (chemical reaction in GDT)} \quad (4)$$

As the formation of $Li_2O_2$ occurs in the tank, surface passivation and pore clogging of the cathode are essentially avoided. In theory, the capacity of the cell would just be limited by the size of GDT tank should sufficient Li metal be used in the anodic compartment. In addition, as the redox mediators generally have fast reaction kinetics, low-cost carbon felt could be used as the cathodic current collector even without electrocatalyst, which is however indispensible in conventional Li—$O_2$ batteries. As such, a "catalyst-free" Li—$O_2$ battery could be developed, which is distinct from the conventional Li—$O_2$ cells.

The redox potential of $Li_2O_2$ in aprotic solvent is ~2.96 V vs. Li/Li$^+$. Considering the redox potentials of ethyl viologen (EV) and iodide, which are ~2.65 V for $EV^+/EV^{2+}$ and ~3.10/3.70 V for $I^-/I_3^{-31}/I_2$ (FIG. 2a), just straddle that of $Li_2O_2$, these two redox species were identified as the mediators for oxygen reduction and evolution reactions in RFLOB, respectively. The potential difference between the mediators and $Li_2O_2$ provides the necessary thermodynamic driving force for the formation and decomposition of $Li_2O_2$ via redox targeting reactions, of which the lower potential of $EV^+$ enables the reduction of $O_2$ forming $Li_2O_2$ during discharge process (reaction 2), while the relatively positive potential of triiodide or iodine facilitates the oxidation $Li_2O_2$ during charge process (reaction 4). Both redox mediators have been tested in static cells and showed good reversibility (FIG. 5).

In an embodiment, the RFLOB was fabricated with a GDT tank filled with 8 ml redox electrolyte consisting of 10 mM $EV^{2+}$/10 mM $I^-$ and 1.0 M lithium bis(trifluoromethane) sulfonimide (LiTFSI) in tetraethyleneglycol dimethylether (TEGDME). The $O_2$ pressure in the tank was kept at 1 atmosphere. Vinylene carbonate pretreated lithium foil was used as anode in the electrochemical cell to preclude the reaction with redox mediators, since the Celgard® separator is unable to block the crossover of the redox mediators. The cell was discharged and charged in galvanostatic mode and the voltage profiles are shown in FIG. 2b. In the first discharging process, only a single voltage plateau at ~2.70 V was observed, which matches the reduction of $EV^{2+}$. However, noting the theoretical discharge capacity of $EV^{2+}$ to $EV^+$ is only ~2 mAh, the much-extended capacity (here the cell capacity was controlled at 6 mAh) implies the reduction of $O_2$ by $EV^+$ in the GDT tank, forming $EV^{2+}$ and $Li_2O_2$ as revealed later. The regenerated $EV^{2+}$ then flows back to the cell and starts a second round of reduction meanwhile electricity is generated. In theory, the above discharge process could carry on until Li metal in the anode is used up and reaches the theoretical specific energy of the cell. For instance, in a non-constrained discharge process close to 80% lithium was converted into $Li_2O_2$ with relatively low overpotential loss in the presence of 10 mM $EV^{2+}$ (FIG. 2c), which paves a way of making low-cost and extremely high-energy density Li—$O_2$ primary cells.

During the charging process, two voltage steps appeared at ~3.55 and 3.75 V (FIG. 2b). The oxidation of $EV^+$ was not observed since most of $EV^+$ have been oxidized to $EV^{2+}$ by the surplus $O_2$ in the tank. Hence the cell voltage shoots directly up to that for the oxidation of $I^-$ to $I_3^-$ upon charging, at which there seemed very limited reaction between $I_3^-$ and $Li_2O_2$ since the capacity extension at this voltage is rather small. Thereafter the voltage rises steadily until it reaches the second voltage plateau. Brown color was built up gradually in the electrolyte, indicating more and more polyiodide was produced. The high voltage plateau corresponds to the further oxidation of $I_3^-$ to higher order polyiodides and eventually to iodine. The extended capacity at the high voltage indicates the reaction between iodine and $Li_2O_2$ was efficient which resulted in the oxidation of the latter and releasing $O_2$.

The charge transfer process between $Li_2O_2$ and $I_2$ is corroborated by theoretical calculations. FIG. 7 shows the electron density difference maps of $I_3^-$ and $I_2$ on $Li_2O_2$ (0001) surface in parallel adsorption geometry, where the blue and yellow zones correspond to electron density deduction and enhancement regions, respectively. Apparently there is a tendency of electron transfer from $Li_2O_2$ to both $I_3^-$ and $I_2$. The charge transfer is quantified by the Bader charge calculation to be 0.49 $e^-$ for $Li_2O_2/I_2$, relative to that for $Li_2O_2/I_3^-$, indicating much more effective electron transfer in the former as compared to the latter.

In the subsequent discharging process, a short voltage plateau appeared at ~3.30 V, attributed to the reduction of triiodide or iodine in the electrolyte. After that, the cell voltage kept stable at ~2.70 V, exhibiting good reversibility of EV. In order to rule out the capacity from the direct reduction of dissolved $O_2$ on the cathode, the cell was also tested in the absence of both redox mediators (FIG. 6). It is obvious that given the extremely low capacity, the reaction of dissolved $O_2$ on the cathode has negligible contribution to the overall cell capacity. In general, one should note that these two molecules would not chemically react with each other upon operation. During discharging, both of the molecules will subsequently be reduced to $I^-$ and $EV^+$ in the cell. Similarly during charging, both of molecules will subsequently be oxidized to $EV^{2+}$ and $I_2$. So it is unlikely that both $I_2$ and $EV^+$ co-exist in the catholyte causing reaction between the two.

The above results are very encouraging that, since the deposition of $Li_2O_2$ mainly occurs in the GDT tank, which intrinsically obviates the passivation and pore clogging of cathode in the cell, very stable voltage profiles with relatively low overpotentials were achieved in the first three cycles, even in the absence of catalysts. To prove the formation and decomposition of $Li_2O_2$ in the GDT tank, X-ray photoelectron spectroscopy (XPS) was employed to investigate the chemical states of Li and O for species formed in the tank at the end of discharge and charge. The signal associated with Li—F bond (56.6 eV) presents in all the samples (FIG. 3), presumably from the remained LiTFSI. The peak of Li—O—O—Li (55.0 eV) is clearly seen in the Li 1s spectra after discharging while nearly disappeared after charging. The existence of $Li_2O_2$ is further corroborated by O 1s spectra, where two large peaks assigned to the O1s (532.3 eV) from LiTFSI and Li—O—O—Li (531.2 eV) in $Li_2O_2$ are evidently observed. The latter then vanished after charging, in agreement with the Li 1s spectra. In order to confirm the formation of $Li_2O_2$ on Ni foam in the GDT tank, XRD measurement was carried out with the sample after full discharging. As the diffraction pattern shown in FIG. 8, the characteristic peaks of $Li_2O_2$ such as (101), (100) are clearly seen. These peaks are relatively broad in width in contrast to those from the Ni substrate, indicating the nanocrystalline nature of the formed $Li_2O_2$. In addition, some minor peaks, which may be assigned to LiOH and $Li_2CO_3$ phases, are also visible. These by-products may plausibly be introduced during sample transfer and/or XRD measurement, which were conducted in air. The XPS and XRD results were further substantiated by scanning and transmission electron microscopic measurements.

As the SEM images shown in FIG. 4, after discharging the smooth surface of pristine Ni foam (FIG. 9a) was covered by a layer of agglomerated particles (FIG. 4a), ENREF 38 which nearly disappeared with only little residual left after charging (FIG. 4b). This is consistent with the XPS measurement should the particles be $Li_2O_2$. The cell in FIG. 2c was also examined after full discharging, in which we expect much more product would be formed in the GDT tank. As revealed in FIG. 9b, not surprisingly, a much thicker layer of particulate precipitate was observed on the Ni foam. The particles are in round shape and 10-20 nm in diameter (FIG. 4c), which are crystalline in nature as revealed by the high resolution TEM. The lattice fringes of (101) and (100) crystal planes of $Li_2O_2$ are clearly identified (FIG. 4d), with d-spacing of 0.25 nm and 0.27 nm, respectively. This unambiguously confirms the formation of $Li_2O_2$ upon discharging.

The above results have convincingly validated the working principle of RFLOB. In order to assess the viability of the cell for long-term cycling, despite that it has yet been optimized and there are a few other critical issues to be addressed (such as the poor cyclability of lithium anode), we tested the cycling performance of the above RFLOB cell at a controlled discharging capacity ($Li_2O_2$ to redox molecules ratio is 1:1). A PVDF-Nafion composite membrane was employed to protect the lithium anode from being attacked by the redox mediators and dissolved $O_2$ upon repeated striping and plating in long cycling process. As the voltage profiles shown in FIG. 2d, relatively large overpotential was observed due to the large IR drop across the membrane. Interestingly, with increasing cycle number, the overpotential of the cell decreased gradually, largely a result of the reduced resistance of the membrane over cycling. There isn't deterioration of charging capacity in the first 30 cycles. Instead, due to improved conductivity of the membrane, the charging capacity was even enhanced with the Columbic efficiency reaching nearly 100% after 10th cycle (FIG. 2d).

As a preliminary proof-of-concept study, we do not attempt to study the influences of flow rate and other operation parameters on the overall device performance before the following factors are optimized: Firstly, the PVDF-Nafion membrane is resistive, which makes up a big IR drop. Secondly, the sluggish reaction between $I_2$ and $Li_2O_2$ and those of $I^-$ on the electrode account for a major loss of overpotential during charging. As a result, the discharging/charging current density is relatively low.

The above results provide compelling evidence and concertedly validate the functionality of RFLOB. That is, with the assistance of redox mediators, the discharging product $Li_2O_2$ could be remotely formed in the GDT tank and reversibly oxidized in the charging process without depositing onto the cathode inside the cell. Such decoupled reactions of $Li_2O_2$ provide great flexibility to circumvent the issues confronted by the conventional $Li-O_2$ batteries. The surface passivation and pore clogging of the cathode resulted from $Li_2O_2$ precipitations, which is inevitable in conventional cells, are essentially avoided under the new operation mode. While the overpotential persists during the charging process, the intolerably large voltage hysteresis could in theory be mitigated by using suitable redox mediators even in the absence of electrocatalysts, which on the other hand is expected to also improve the cycling stability of the cell. In addition, the capacity of the cathode could be expanded by simply enlarging the size of GDT tank, which is however constrained by the pore volume of cathode and catalysts deposited on it in the conventional $Li-O_2$ batteries. Moreover, as the reaction of $O_2$ in GDT is far apart from the electrodes, the tolerance of the cell towards air would be enhanced as well.

While promising, to develop RFLOB into a viable device for advanced large-scale energy storage, the large voltage hysteresis would have to be further reduced. In the present study, the stagnant reaction between triiodide and $Li_2O_2$ and resistive $Li^+$-conducting membrane represent the main causes of the large overpotential during charging process. Faster redox mediators with matched potential to the oxidation of $Li_2O_2$ are desired to expedite the reactions. In addition, optimization of the three-phase interface in the GDT tank to facilitate the reactions of $O_2$ and $Li^+$, and more effectively utilize the volume to accommodate $Li_2O_2$ is also required. Highly porous low-weight materials with good affinity to the deposition of $Li_2O_2$ and superior chemical resistance would be the ideal option. We are currently pursuing the above aspects to develop RFLOB into a low-cost and durable alternative to the $Li-O_2$ batteries for large-scale energy storage applications.

In comparison with current metal-oxygen batteries, the present invention greatly alleviates the use of noble catalysts, dramatically lower the overpotential or polarization, and pore clogging of the cathode is avoided which leads to a lower cost, higher energy efficiency and improved capacity.

Whilst there has been described in the foregoing description preferred embodiments of the present invention, it will be understood by those skilled in the technology concerned that many variations or modifications in details of design or construction may be made without departing from the present invention.

The invention claimed is:
1. A battery system, the system comprising:
    (a) a cell comprising a metal anode and a current collector, the metal anode and the current collector separated by a separator;
    (b) a gas diffusion tank comprising an inlet for receiving oxygen in the gas diffusion tank, wherein the gas diffusion tank is connected to the current collector; and
    (c) a connector between the current collector and the gas diffusion tank, the connector structured to allow an electrolyte to flow between the current collector and the gas diffusion tank, the electrolyte comprising redox molecules for reducing the oxygen within the gas diffusion tank in a reduction reaction, reduced oxygen and metal ions in the electrolyte form metal-oxygen products in the gas diffusion tank, and the redox molecules flow back to the current collector after the reduction reaction,
    wherein the redox molecules comprise any molecule selected from the group consisting of a quinone derivative, an aromatic amine derivatives, a phenazine derivatives, a phenothiazine derivatives and quinoxaline.
2. The system according to claim 1, wherein a concentration of the redox molecules in the electrolyte is about 5 mM to 5 M.
3. The system according to claim 1, wherein the separator selectively allows a passage of the metal ions only.
4. The system according to claim 1, wherein the separator is any one selected from the group consisting of a lithiated Nafion or its composite membrane, and a lithium ion conductive ceramic membrane.
5. The system according to claim 1, wherein the metal anode comprises any metal selected from the group consisting of lithium, sodium, potassium, calcium, aluminium, zinc and magnesium.

6. The system according to claim 5, wherein the metal anode comprises a lithium metal electrode, and wherein the lithium metal electrode is a vinylene carbonate pre-treated lithium foil.

7. The system according to claim 6, wherein the lithium metal electrode further comprises a PVDF-Nafion composite membrane.

8. The system according to claim 1, wherein the current collector comprises a porous conducting matrix.

9. The system according to claim 8, wherein the porous conducting matrix is carbon felt.

10. The system according to claim 1, further comprising a pump to pump the electrolyte between the current collector and the gas diffusion tank.

11. The system according to claim 1, wherein a pressure of the oxygen in the gas diffusion tank is 1 atmosphere.

12. The system according to claim 1, wherein the battery system does not include a catalyst in the cell.

\* \* \* \* \*